United States Patent
Garcia et al.

[11] Patent Number: 6,105,482
[45] Date of Patent: Aug. 22, 2000

[54] SELF-ADJUSTING CLAMPING DEVICE

[75] Inventors: Jaime E. Garcia, Wexford; Charles J. Baird, Pittsburgh, both of Pa.

[73] Assignee: Delta International Machinery Corp., Pittsburgh, Pa.

[21] Appl. No.: 09/027,377

[22] Filed: Feb. 20, 1998

[51] Int. Cl.⁷ ................................................. B23D 51/08
[52] U.S. Cl. .................. 83/698.31; 83/699.21; 30/338
[58] Field of Search .................. 83/783, 698.71, 83/699.21, 698.31, 698.21, 698.91; 30/338, 337, 339

[56] References Cited

U.S. PATENT DOCUMENTS

| | | |
|---|---|---|
| 312,400 | 2/1885 | Stanford . |
| 1,659,801 | 2/1928 | Basmaison . |
| 1,877,705 | 9/1932 | Tautz . |
| 1,956,912 | 5/1934 | Tate et al. . |
| 1,964,651 | 6/1934 | Tautz . |
| 1,964,652 | 6/1934 | Tautz . |
| 1,969,827 | 8/1934 | Tautz . |
| 1,984,500 | 12/1934 | Tautz . |
| 2,073,430 | 3/1937 | Tautz . |
| 2,099,321 | 11/1937 | Tautz . |
| 2,240,755 | 5/1941 | Briggs . |
| 2,721,587 | 10/1955 | Dremel . |
| 2,731,988 | 1/1956 | Steiner . |
| 3,542,097 | 11/1970 | Dudek et al. . |
| 4,106,181 | 8/1978 | Mattchen . |
| 4,294,013 | 10/1981 | Krieg . |
| 4,575,936 | 3/1986 | Gringer . |
| 4,601,477 | 7/1986 | Barrett et al. . |
| 4,616,541 | 10/1986 | Eccardt et al. . |
| 4,681,006 | 7/1987 | Miller . |
| 4,807,507 | 2/1989 | Rice et al. ............................ 83/699.21 |
| 4,825,741 | 5/1989 | Wellington et al. . |
| 4,838,138 | 6/1989 | Rice et al. . |
| 5,016,512 | 5/1991 | Huang . |
| 5,058,280 | 10/1991 | Pollak et al. . |
| 5,088,369 | 2/1992 | Rice et al. . |
| 5,103,565 | 4/1992 | Holzer, Jr. . |
| 5,138,914 | 8/1992 | Brickner . |
| 5,267,498 | 12/1993 | Miyamoto et al. . |
| 5,363,733 | 11/1994 | Baird et al. . |
| 5,410,933 | 5/1995 | Miaymoto et al. . |
| 5,443,276 | 8/1995 | Nasser et al. . |
| 5,697,279 | 12/1997 | Schnizler et al. .................... 83/699.21 |

*Primary Examiner*—M. Rachuba
*Attorney, Agent, or Firm*—Kirkpatrick & Lockhart LLP

[57] ABSTRACT

A clamping device for securing an object includes a body having a block and a pin mounted thereon. The block is movably mounted on the body and preferably may move relative to the body along a line that is oblique to a center line of the body. The block may be in a first position, at which the surface of the block contacts or is adjacent to the pin's perimeter, and a second position, at which a distance between the surface of the block and the pin's perimeter is greater than when said block is in said first position.

33 Claims, 6 Drawing Sheets

SELF-ADJUSTING CLAMPING DEVICE

BACKGROUND OF THE INVENTION

1. Field of the Invention

The present invention relates to apparatus for clamping and securing objects including, for example, saw blades. More particularly, the present invention relates to a saw blade clamping device for use in conjunction with a scroll saw and which allows a saw blade to be fastened to the saw without the need for significant adjustment by the operator.

2. Description of the Invention Background

Devices that hold or clamp an object in a desired orientation or in a desired position relative to other objects are necessary in many applications. For example, any sawing device incorporating an elongate saw blade having terminal ends typically includes a device for attaching at least one end of the saw blade to a portion of the saw that is selectively driven to reciprocate. Scroll saws and jigsaws, for example, many include a two-armed member or yoke that is generally C-shaped or U-shaped and that selectively reciprocates about a pivot point located at the yoke's rear or center region. A saw blade is connected between the free ends of the arms and cuts the workpiece as the yoke reciprocates.

When using a jig saw or scroll saw, it is often necessary to detach one or both ends of the saw blade from the saw. For example, worn or broken blades require replacement, one blade type or size may be replaced with another type or size for a specific application or during particular cutting operations, or one end of the blade may be detached from the machine so that the freed end may be passed through a bore in the workpiece. As such, the ease of operation of the clamping device connecting the saw blade to the saw becomes important.

A variety of clamping devices for connecting a saw blade to jig saws and scroll saws are known. For example, one basic device for attaching a saw blade to a scroll saw is in the form of a blade chuck that exerts clamping force on the blade through the threaded advancement of either a screw or a nut. FIG. 2 of U.S. Pat. No. 4,681,006, issued to Miller on Jul. 21, 1987, illustrates a device which clamps the end of the blade between the flat surface of a blade holder member, attached to the reciprocating arm, and a square nut threadedly attached to a threaded screw extending through a portion of the blade holder member. U.S. Pat. Nos. 2,099,321 and 1,964,651, issued to Tautz on Nov. 16, 1937 and Jun. 26, 1934, respectively, disclose a scroll saw blade chuck that secures the saw blade end through force exerted by tightening a thumbscrew against a wall of the chuck. FIGS. 9 and 10 of U.S. Pat. No. 1,877,705 issued on Sep. 13, 1932, to Tautz teach a scroll saw blade chuck including a horizontally extending socket head set screw threaded into the chuck body to place clamping pressure on jaws within the chuck.

The aforementioned existing designs require significant time to change or detach a blade and also require either the use of tools or the exertion of significant force to securely clamp the blade within the chuck. Changing a blade may be particularly difficult where, for example, the threads of the chuck's set screw are clogged or otherwise impaired, thus making rotation of the screw difficult.

Because the blade may need to be detached or replaced frequently, saw blade chucks that may be operated with little effort and that require little time in order to detach or replace saw blades provide distinct advantages. U.S. Pat. No. 5,363,733, issued to Baird et al. on Nov. 15, 1994, provides a saw blade chuck that may be quickly engaged and disengaged to secure and release an end of a saw blade. The elements of the chuck of the '733 patent are arranged so as to provide a mechanical advantage that magnifies the force applied by the operator to engage the clamp and secure the blade within the chuck. Although the chuck of the '733 patent provides distinct advantages over the known saw blade clamping devices, it must be manually engaged and disengaged from clamping the saw blade and it also must be manually adjusted to account for saw blades having different thicknesses.

Accordingly, the need exists for a saw blade clamp that will quickly and effectively attach saw blades of different thicknesses to sawing devices with minimal need for manipulation by the saw's operator. More generally, the need exists for improved clamping devices for objects not limited to saw blades, and that will clamp or secure such objects with little effort on the part of the operator and without the need for significant adjustment to account for variation in the dimensions of the various objects to be clamped.

SUMMARY OF THE INVENTION

The present invention is directed, in part, to a clamping device which addresses the above-discussed needs, among others, and which, in particular, provides an apparatus for efficiently and effectively fastening a saw blade to a scroll saw and like sawing devices with the need for minimal adjustment by the operator. Moreover, it will be appreciated that the present invention may be applied to the more general task of quickly and easily clamping and holding in place an object of virtually any type so long as the structural elements of the present invention are sized to fit that object.

In accordance with the present invention, there is provided a self-adjusting clamping device for clamping and holding an object. The present self-adjusting clamping device includes a pin and a block, both mounted on a body. The pin is rotatably mounted on the body and rotates relative to the body about an axis of rotation. The pin may be mounted on, for example, an axle for rotation relative to the body. The block is mounted to the body for translational motion relative to the body. Preferably, such translational motion occurs along a straight line segment that is oblique to and to one side of a center line of the body. It is also preferable that the pin's axis of rotation is disposed on a region of the body that is on the other side of the center line.

As used herein, the term "center line" refers to an arbitrary straight line segment within the body of the clamping device and that is selected as a reference relative to which placement of the pin and the path of movement of the block may be described. The terms "translational motion" and "translational movement" are used herein to refer to the motion of an object along a line of any type. Thus, as used herein, "translational" movement or motion may be along a straight line (i.e., "linear"), along a curved line, or along a series of connected straight and/or curved lines. As used herein, translational motion does not include rotation. The term "oblique" is used herein to refer to a line that is neither perpendicular nor parallel to another referenced line.

The block of the present invention may move relative to the body between a first position, wherein the block is at a first end of its range of translational motion and at which position the clamping device is in an "engaged" configuration, and a second position, wherein the block is at a second end of its range of translational motion and at which position the clamping device is in a "disengaged"

configuration. In the clamping device's engaged configuration, a surface of the block contacts or is adjacent to the pin's perimeter. In the clamping device's disengaged configuration, the foregoing surface of the block is disposed at a distance from the perimeter of the pin that is greater than the distance between the perimeter of the pin and the surface of the block that exists when the clamping device is in the engaged configuration. Thus, as the block moves from its first position (corresponding to the device's engaged configuration), through the various intermediate positions, and to its second position (corresponding to the disengaged configuration), the distance between the surface of the block and the perimeter of the pin increases, and vice versa.

Although the term "block" is used herein to describe an element of the invention, it will be understood that that element may have any shape that includes at least a surface suitable for clamping an object between that surface and the perimeter of the pin. The block is preferably shaped as a wedge and the block includes at least one surface that preferably is roughened (such as with, for example, knurling, serrations, teeth, or notches) or is otherwise constructed to better grip the surface of the object to be clamped and that may co-act with the pin's perimeter to clamp the object therebetween. The pin may have any shape wherein a perimeter of the pin may co-act with the aforementioned surface of the block to clamp an object therebetween. Thus, although a pin having a cylindrical perimeter is preferred, it is contemplated that pins having other perimeter shapes, such as, for example, ovoid or cam shapes, may be used in the present invention.

The block preferably is slidingly mounted on the body for linear motion relative to the body. Most preferably, the sliding motion of the block relative to the body is achieved by providing a groove on a surface of the wedge and tongue connected to the body and that is slidingly disposed in the groove such that the wedge may slide linearly on the body between the aforementioned first and second positions. However, it will be understood that the block and body may be configured in any way such that the block is retained on the body but may also move relative to the body between the aforementioned first and second positions and all intermediate positions therebetween. The block preferably is slidably mounted relative to the pin such that a surface of the wedge contacts the perimeter of the pin, and the device is in the engaged configuration, when the block is in its first position, at which point the block is at the first end of its range of linear translational motion. A gap exists between the aforementioned surface of the block and the perimeter of the pin when the block is in its second position, at which point the block is at the second end of its range of translational motion and in which case the device is in the disengaged configuration. When the block is disposed along its linear path at positions between the first and second positions, a gap also exists between the block and the perimeter of the pin, and the gap increases in size as the block moves toward its second position.

The rotational movement of the pin and the translational movement of the block preferably are physically interconnected by an interconnecting member such as, for example, an arm. In one arrangement, the arm is mounted at one point for rotation relative to the body about the axis on which the pin rotates and the arm's rotational motion is coupled to that of the pin. The arm is also connected at a second point to the block. Preferably, the body includes a slot through which a portion of the block protrudes and to which the arm is connected. As the arm is rotated in a given direction about the axis of the pin, the pin is also caused to rotate in the same direction, the block is urged toward one of its first and second positions, and, correspondingly, the clamping device is urged toward one of its engaged and disengaged configurations. Conversely, as the arm is rotated in the opposite direction about the pin's rotational axis, the pin is also rotated in the same direction and the clamping device is urged toward the other of its engaged and disengaged configurations. Thus, the arm may have any construction by which the rotation of the arm around the axis of the pin may be linked to the translational movement of the block.

A biasing member preferably is provided to apply a biasing force on the foregoing arm. The biasing member may be, for example, a spring. The biasing force acting on the arm serves to bias the arm in a direction such that the block is urged toward the first end of its range of translational motion. As described above, when the block moves in the direction toward the first end of its range of translational motion, the gap between the surface of the block and the surface of the pin is reduced. The biasing force of the biasing member acting on the arm must be overcome before the arm can be rotated in the appropriate direction so that the block can be urged toward the second end of its range of translational motion. As described above, as the block moves toward the second end of such range, the gap between the surface of the block and the perimeter of the pin is increased.

In the case of a typical scroll saw having a C-shaped or U-shaped yoke having upper and lower arms between which a saw blade is connected, the clamping device of the present invention preferably is fixedly attached to and hangs downward from a tensioning device attached to or incorporated in the yoke's upper arm so that the first and second ends of the block's range of translational motion correspond to the lower and upper ends of such range, respectively. Such tensioning devices are well known in the woodworking machinery art and include, for example, the devices disclosed in U.S. Pat. Nos. 4,681,006 and 5,088,369. In operation, one end of the saw blade is secured to the yoke's lower arm by a conventional saw blade chuck. To connect the remaining end of the saw blade to the clamping device of the present invention, the device's arm is rotated against the biasing force of the spring, the block is urged toward the upper end of its range of translational motion, and the clamping device is urged toward its disengaged configuration. A scroll saw blade is then placed within the gap created between a surface of the block and the perimeter of the pin. The arm is then released and the biasing force of the biasing member rotates the arm in the opposite direction, urging the block back toward the lower (first) end of its range of translational motion, thereby compressing the saw blade between the co-acting surface of the block and the perimeter of the pin. The tensioning device is then initiated so as to place the saw blade in tension between the arms. Because the saw blade is securely clamped to the lower arm of the yoke, it tends to pull away from the present clamping device when placed in tension and could pull out of the clamping device entirely if unchecked. However, because the saw blade is compressed between the co-acting surface of the block and perimeter of the pin, the tensioning force not only pulls the saw blade downward but also urges the block further toward the lower (first) end of its translational motion range and the distance between the block's surface and the pin's perimeter decreases so as to more securely clamp the saw blade therebetween. As such, the compressive force exerted on the blade by the surface of the block and the perimeter of the pin is increased, and the blade is clamped even more securely in place, as tension on the saw blade is increased. Tension on the blade may be increased by initiating the tensioning device, but also increases during operation of the saw as the saw blade encounters the workpiece. When it is necessary to release the saw blade from the present device (for example, in the case of a scroll saw, to insert the saw blade through a hole in the workpiece or to change saw blades), the tension exerted by the tensioning device is released and then the arm of the clamping device is rotated in a direction that is against the force of the biasing member, thereby increasing the distance between the co-acting surface of the block and the perimeter of the pin to thereby release the blade from compression.

In the foregoing description, the present clamping device in the form of a scroll saw blade clamp is caused to more securely clamp the saw blade by initiating a tensioning device that places the saw blade in tension and tends to pull the saw blade away from the device. However, it will be understood that the novel action of the invention (by which clamping force increases as the force pulling the clamped object from the device increases) may be brought about by any action that tends to pull the clamped object from the clamping device. Thus, for example, a heavy object pulling downward with its own weight from a particular construction of the present clamping device will be more securely clamped than an object of lesser weight pulling down from the same clamping device. Thus, it will be understood that in particular applications a tensioning device will be unnecessary and that in those particular applications the clamped object need not be supported or secured save by the present clamping device.

As described herein, the present invention relates to an apparatus for fastening objects including, for example, saw blades and the like, onto other devices. The present invention also is directed to scroll saws and other devices having connected thereto a clamping device having the construction of the present invention. Accordingly, the present invention provides for a clamping device that may be used to easily and quickly fasten an object such as, for example, a saw blade, to another object such as, for example, a sawing device, without the need for adjustment of the clamping device by the operator prior to use. The present device adjusts for differences in the thicknesses of clamped objects and does not require forceful manipulation by the operator in order to securely clamp the object.

The reader will appreciate these and other details, objects, and advantages of the present invention upon consideration of the following detailed description of embodiments of the invention, and may also comprehend such details, objects, and advantages of the invention upon practicing the invention.

BRIEF DESCRIPTION OF THE DRAWINGS

In the accompanying drawings, embodiments of the present invention are shown wherein like reference numerals are employed to designate like elements and wherein.

DETAILED DESCRIPTION OF EMBODIMENTS OF THE PRESENT INVENTION

Referring now to the drawings for the purposes of illustrating embodiments of the invention only, and not for purposes of limiting the same, the figures show a self-adjusting clamping device of the present invention. More particularly, and with reference to FIG. 1, a self-adjusting clamping device adapted for fastening a saw blade to the arm of a scroll saw is shown generally as 1. Preferably, the construction of the self-adjusting clamping device 1 of the present invention includes a body 10, pin 20, block 30, arm 40, and fastening portion 50.

Figure 1:
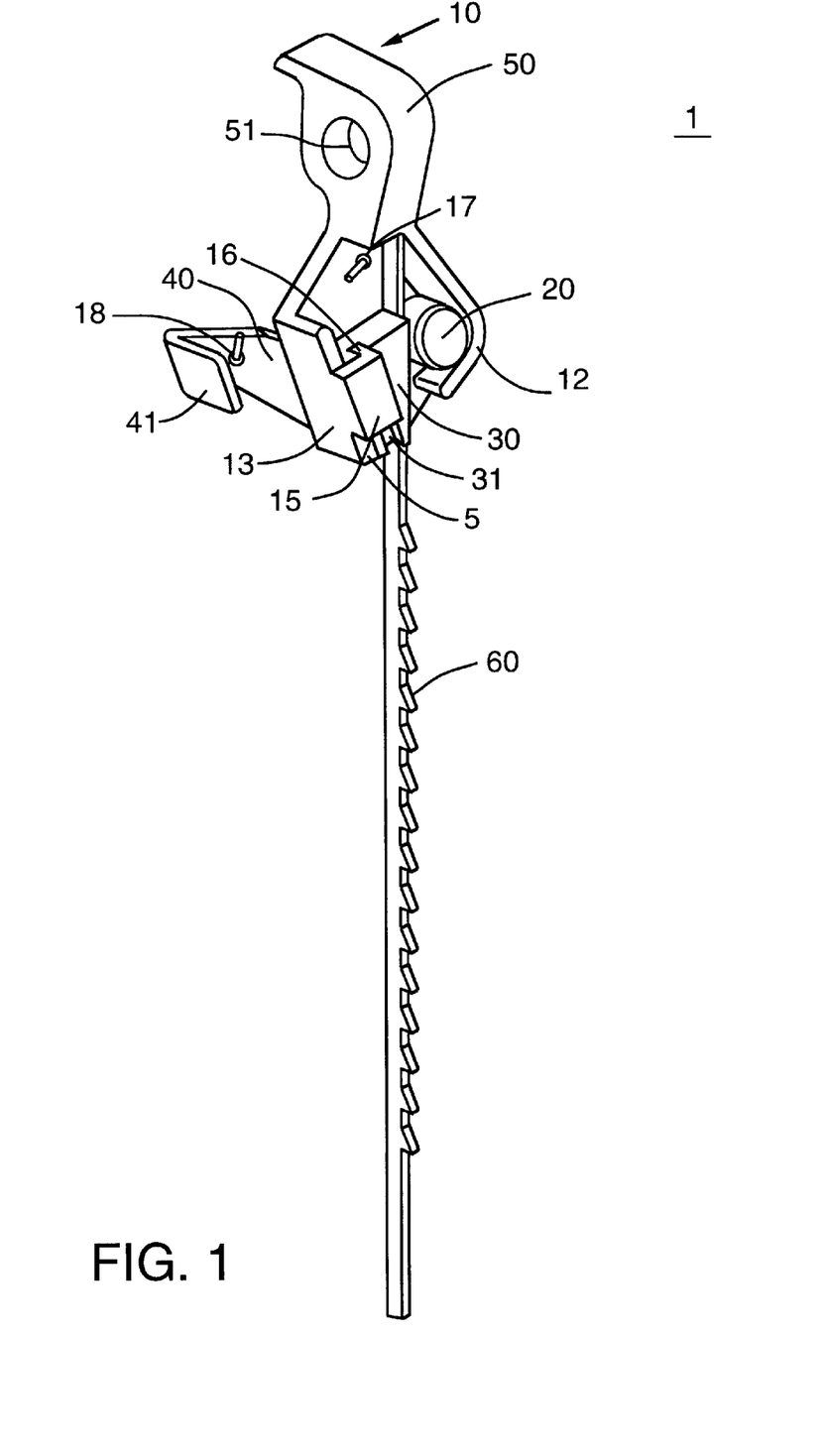
FIG. 1 is a front-side perspective view of an embodiment of the present invention.
Figure 2:
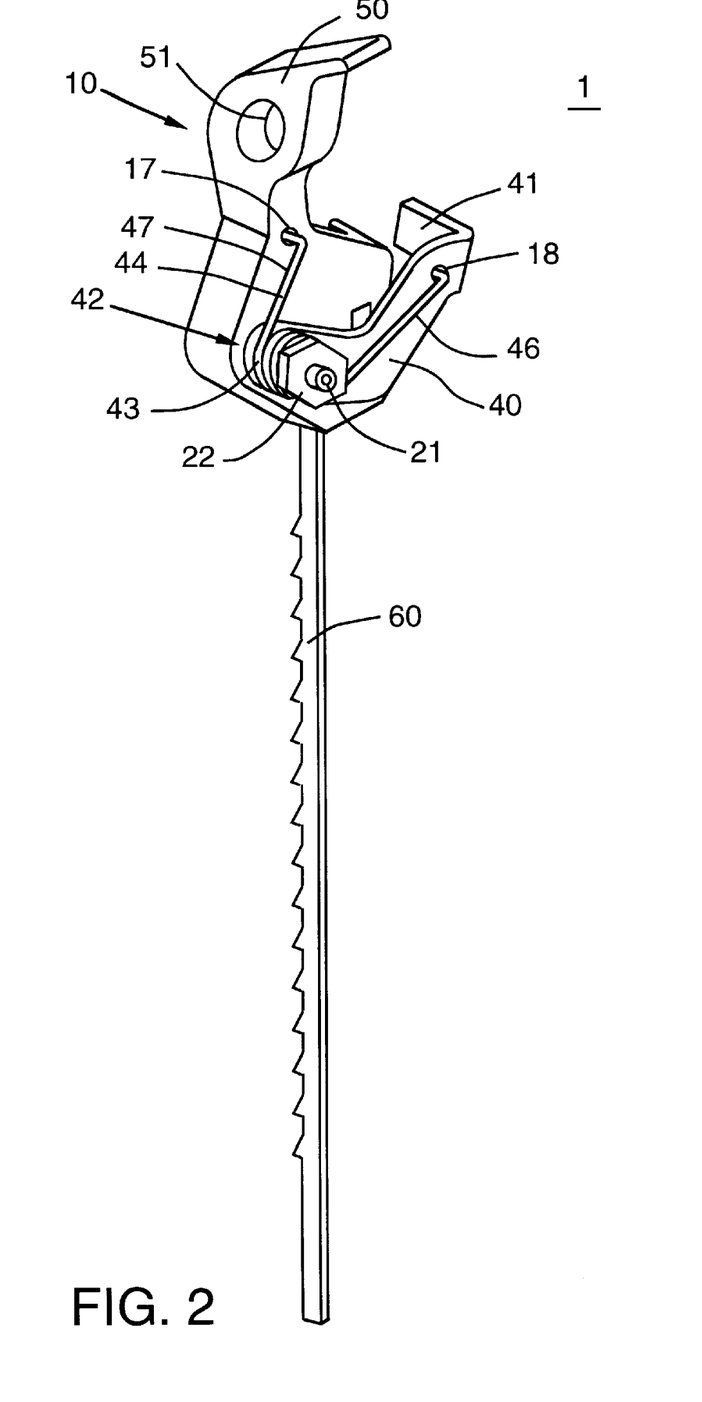
FIG. 2 is a rear-side perspective view of the embodiment of FIG. 1.
Figure 3:
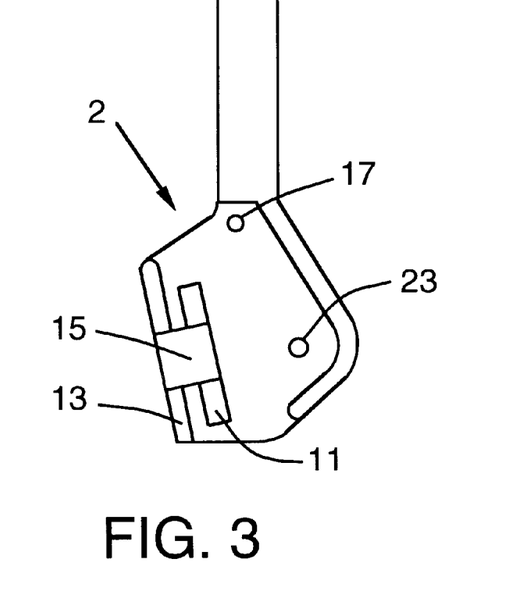
FIG. 3 is a front side view of the body portion of the embodiment of FIG. 1.
Figure 4:
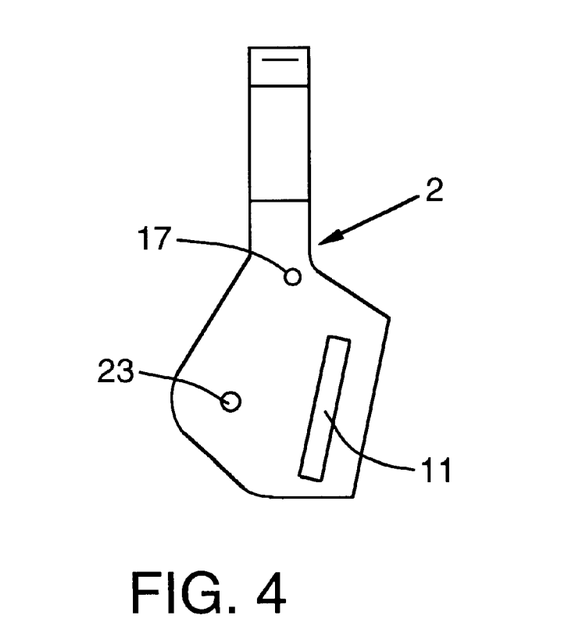
FIG. 4 is a back side view of the body portion of the embodiment of FIG. 1.
Figure 5:
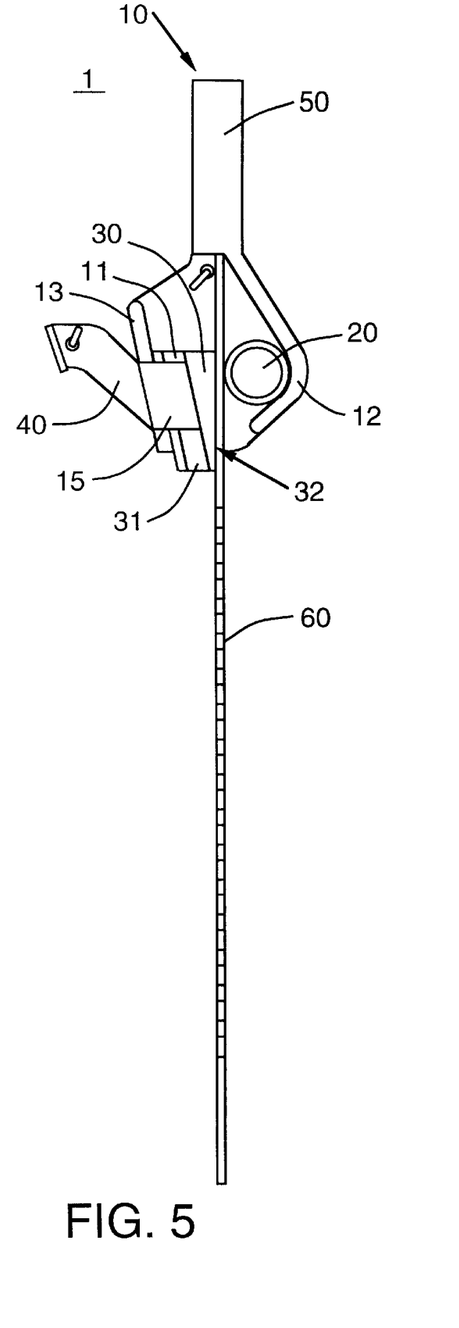
FIG. 5 is a front-side view of the embodiment of FIG. 1 in the engaged configuration.
Figure 6:
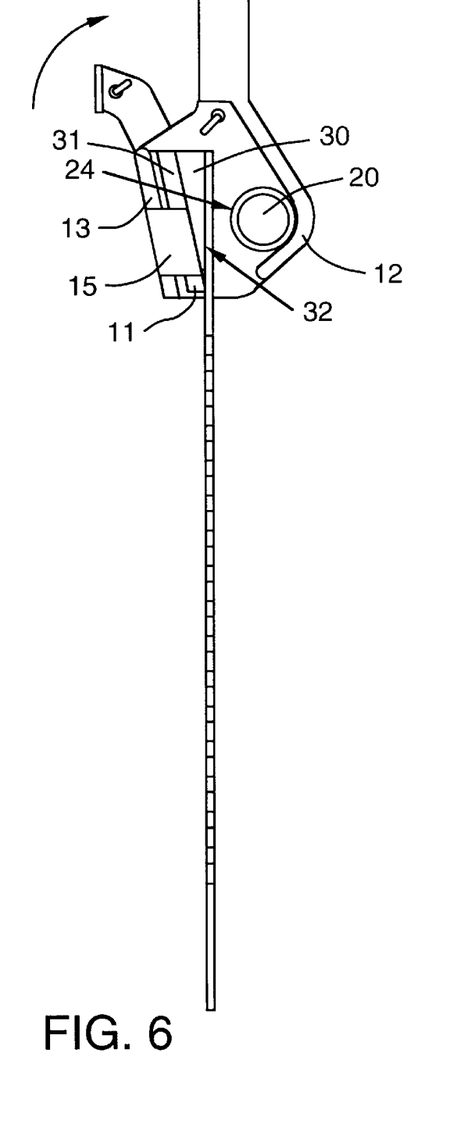
FIG. 6 is a front-side view of the embodiment of FIG. 1 in the disengaged configuration.

As best shown in FIGS. 2, 3, and 4, the clamping device 1 is provided with a slot 11 running diagonally along the body 10 of the clamping device 1. As best shown in FIGS. 1, 5 and 6, a wedge shaped block 30 is seated within the slot 11. The block 30 is adapted to travel along the length of the entire slot 11 and thus may be at the upper or lower end of the slot 11 or at some intermediate position. The wedge 30 is closely abutted by wall 13. Wall 13 is positioned parallel to slot 11 such that it aids in retaining a portion of wedge 30 within slot 11 and restricts lateral movement of wedge 30 within the slot 11 as the wedge 30 travels along the slot 11. The wall 13 includes a cuff portion 15 positioned along the upper edge thereof. Preferably, the cuff 15 is positioned along the wall 13 such that it closely communicates with the upper surface of the wedge 30. As such, the wedge 30 is bordered on its rear surface by the body 10 of the clamping device 1 and on its frontal surface by the cuff 15. The combination of the cuff 15 and wall 13 serves to maintain the wedge 30 within the slot 11 during translational movement along the length of the slot 11. The cuff 15 further includes a tongue 16 disposed thereon. A corresponding groove 31 is disposed along the frontal surface of wedge 30. Groove 31 is shaped to accept and closely communicate with tongue 16. The tongue 16, groove 31, and slot 11 are oriented in a parallel relation to one another. Thus, as the wedge moves along the slot 11, the tongue 16 slides in the groove 31. This tongue 16 and groove 31 arrangement serves to constrain any movement of the wedge 30 other than translation of the wedge 30 along the length of the slot 11.

The pin 20 is disposed on and fixedly connected to an axle 21. However, it will be understood that any suitable alternate arrangement for rotatably mounting pin 20 to body 10 may be used. The axle 21 is mounted for rotation relative to the body within a bore 23, best shown in FIGS. 3 and 4, through the body 10. As such, the pin 20 is free to rotate with axle 21 within bore 23 relative to the body 10. The pin 20 is preferably circular in shape, however, it will be appreciated that other shapes, such as, for example, an oval or cam shaped pins could also be used in the present invention. The perimeter of the pin 20 is closely abutted on one hemisphere by a radial wall 12. Wall 12 is shaped to closely abut the perimeter of pin 20. The radial wall 12 serves to constrain any movement of the pin 20 other than rotation with axle 21.

Figure 7:
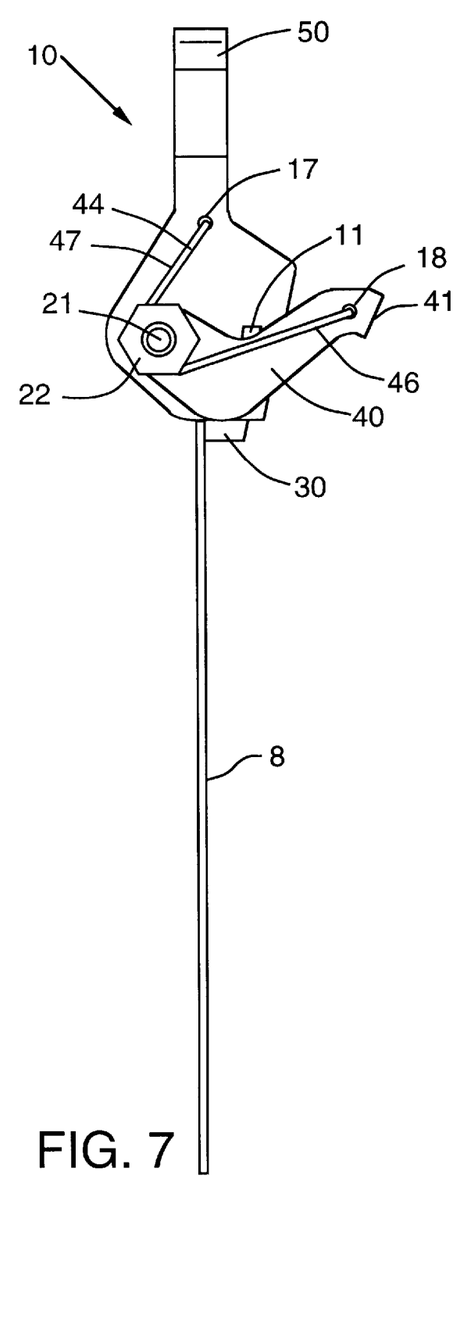
FIG. 7 is a back-side view of the embodiment of FIG. 1 in the engaged configuration.
Figure 8:
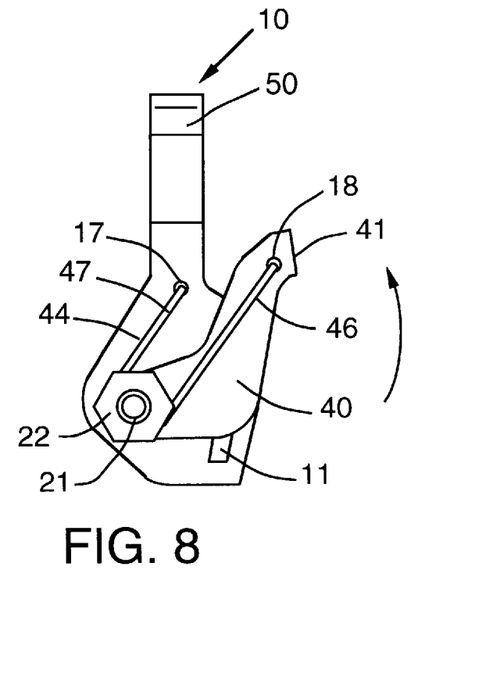
FIG. 8 is a back-side view of the embodiment of FIG. 1 in the disengaged configuration.

As best shown in FIGS. 2, 7, and 8, movement of the wedge 30 and rotation of the pin 20 are physically interrelated by means of arm 40. Preferably, the arm 40 is formed with a protrusion 41 at one end to aid gripping and actuation of the arm 40. The arm 40 is mounted on axle 21 in bore 23 for rotational motion therein. The arm is also joined at a point along its length to the portion of the wedge 30 extending through slot 11. As such, it will be appreciated that rotation of the arm 40 about bore 23 will cause the wedge 30 to move linearly along the length of slot 11 and will cause rotation of the axle 21 and pin 20. A tensioning spring 44 is provided between the arm 40 and the body 10 of the clamping device 1. The spring 44 serves to bias the arm 40 downward into an engaged position in which the wedge 30 is held at the bottom end of the slot 11 by the force of the spring 44 acting on the arm 40.

In the clamping device's engaged configuration, the wedge 30 has been forced downward such that surface 32 of wedge 30 contacts the perimeter of pin 20. To move the wedge 30 toward the top end of slot 11 (at which point the clamping device 1 is in its disengaged configuration) it is necessary to overcome the biasing force of the spring 44 acting on the arm 40. In the disengaged configuration, the wedge 30 has been forced upward such that surface 32 of wedge 30 does not communicate with the perimeter of pin 20. Preferably, the spring 44 is formed from a resilient metallic wire, as is depicted in the accompanying figures, and the wire is formed into a coil around the axle 21 to create the desired amount of biasing force. The greater the number of revolutions in the coil, the greater the biasing force created by the spring 44. One end of the wire is connected to the body of the clamping device 1 at a bore 17 in the body 2 and the other end of the wire is connected to the arm 40 at bore 23. As such, the force created by the coil acts to urge the ends of the wire in opposite directions, thus increasing the relative angle therebetween, and thereby forcing the clamping device 1 into the engaged configuration.

Preferably, the slot 11 is angled such that when the wedge 30 is at the lower end of the slot 11 the clamping device 1 is in the engaged configuration in which the object to be clamped, such as saw blade 60, is compressed between the surface 32 of the wedge and the perimeter of the pin 20 (see FIGS. 5 and 7). When the wedge is at the upper end of the slot 11 the clamping device 1 is in the disengaged configuration, in which a gap exists between the surface of the wedge 32 and the outer perimeter of the pin 20 (see FIGS. 6 and 8) and the object is not squeezed between wedge 32 and pin 20. As seen in FIGS. 5 and 7, the force created by the spring 44 acting on the arm 40 serves to bias the wedge 30 into the engaged position in which the wedge 30 is located at the bottom of the slot 11. However, as seen in FIGS. 6 and 8, when a force sufficient to overcome the tension in the spring 44 is applied to the arm 40, the arm 40 is rotated against the force of the spring 44, the angle between the ends of the spring arms 46 and 47 is decreased, and the wedge 30 is made to slide up the slot 11 and toward a position at which the clamping device 1 is in its disengaged configuration. The rotation of arm 40 from the position at which the clamping device is in the engaged configuration, shown in FIGS. 5 and 7, to the position at which the clamping device is in the disengaged configuration, shown in FIGS. 6 and 8, is indicated by the arrows in FIGS. 6 and 8.

Figure 9:
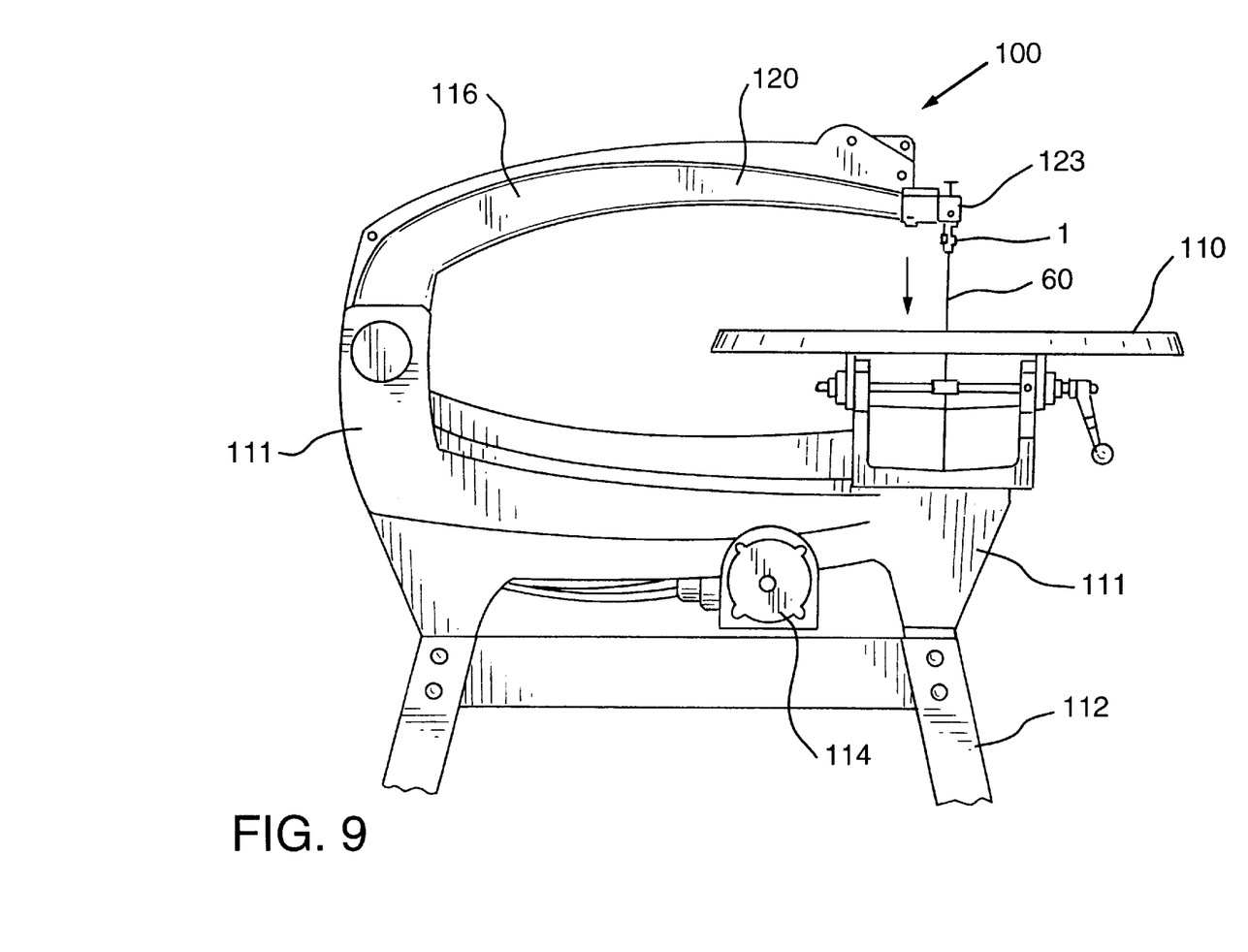
FIG. 9 is a side elevational view of a scroll saw having a tensioning device and to which the embodiment of FIG. 1 is attached.

In operation, the clamping device 1 is preferably adapted to be fastened to a tensioning device that is, in turn, attached to an arm of a scroll saw. An example of such an arrangement is shown in FIG. 9, wherein scroll saw 100 includes work support table 110, base portion 111, stand 112, motor 114, and yoke 116 having an upper arm 120 and a lower arm (obscured in FIG. 9). Saw blade 60 is secured between the tensioning device 123 attached to the yoke's upper arm 120 and lower arm. Saw blade 60 is secured to the tensioning device 123 by the above-described embodiment 1 of the self-adjusting clamping device of the present invention. In order to secure clamping device 1 to the end of the tensioning device attached to upper arm 120, the clamping device 1 preferably includes fastening portion 50, best shown in FIG. 1. The fastening portion includes a bore 51 therethrough and is otherwise adapted to be secured to the tensioning device. Other configurations of the fastening portion 50 useful for securing the clamping device 1 to the tensioning device will be apparent to those of ordinary skill.

Once the clamping device 1 has been secured to the upper arm 120 of the scroll saw 100, the blade 60 is secured to the clamping device 1. To secure blade 60 to the clamping device 1 of the present invention, the arm 40 is rotated so that the clamping device is in its disengaged configuration (see FIGS. 6 and 8) and then blade 60 is inserted into the space between the wedge 30 and the pin 20 such that the blade 60 is interposed between surface 32 of the wedge 30 and the perimeter of the pin 20. With the blade 60 still interposed between surface 32 of the wedge 30 and the perimeter of the pin 20, the arm 40 is released. As seen in FIGS. 5 and 7, the force of the coil spring 44 acting on arm 40 causes the arm 40 to rotate and urge the clamping device toward the engaged configuration. As such, the wedge 30 slides toward the bottom of the slot 11, and pin 20 rotates on the axle pin 21. The blade 60 is thereby compressed between the surface 32 of the wedge 30 and the perimeter of the pin 20. Initiating the tensioning device so as to placing blade 60 in tension between the arms of yoke 116 urges blade 60 downward and in the direction of the arrow in FIG. 9. That movement in turn urges the wedge 30, to which an end of blade 60 is compressed by force spring 44, to a lower position in slot 11, thereby decreasing the space between surface 32 of wedge 30 and the perimeter of the pin 20. The rotation of pin 20 as the blade is pulled downward facilitates downward movement of the wedge 30 and aids in further decreasing the distance between surface 32 and the perimeter of wedge 30.

The foregoing co-action of elements that occurs as the blade 60 is tensioned between the scroll saw's upper and lower arms serves to compressively clamp the blade 60 between surface 32 of the wedge 30 and the perimeter of pin 20.

Release of the blade 60 from the surface 32 and pin 20 of clamping device 1 is accomplished by rotating the arm 40 against the force of the spring 44 and toward a position at which the clamping device 1 is in the disengaged configuration, thereby creating sufficient separation between the surface 32 of the wedge 30 and the perimeter of the pin 20 to release the blade 60 from compressive clamping by the clamping device 1.

Although the above-described embodiment has specific application as a saw blade clamping device for a scroll saw, it will be understood that the invention, properly configured, may be used in numerous other related and unrelated applications requiring the clamping of an object. In such other applications, the object clamped in the present invention may be entirely unsupported at any other position on the object. In particular, objects that hang from the clamping device of the invention and that are unsupported at any other position may exert sufficient downward force, either because of their weight or because of external influences exerted upon them, to initiate the novel clamping action of the invention whereby the force pulling the object from the present clamping device causes the object to be even more securely clamped between the block and pin elements of the invention. Such other applications include, for example, the lifting of heavy objects such as trees, metal bars and plates, and metal scrap. For example, an end of a heavy metal plate may be inserted between the present clamping device's block and pin while the device is in its disengaged position, and the arm may be released so that the biasing member will clamp the plate. (If the block is of sufficient mass such that its weight clamps the plate between itself and the pin, the arm and biasing member may be unnecessary.) As the clamping device is lifted by, for example, a chain or steel rope or wire, the plate will tend to be pulled from the device and that relative movement between the plate and the present device will result in the translational movement of the block further toward its first position, thereby decreasing the distance between block and pin and more securely clamping the plate therebetween. The plate may them be lifted by the clamping device. To ensure translation of the block as the clamped object is pulled from the clamping device, the surface of the block contacting the clamped object may be suitable coated or textured.

Those of ordinary skill in the art will, of course, appreciate that various changes in the details, materials and arrangements of parts which have been herein described and illustrated in order to explain the nature of the invention may be made by those skilled in the art within the principle and scope of the invention as expressed in the appended claims.

What is claimed is:

1. A clamping device for securing an object, the clamping device comprising:
   a body;
   a pin having a curved outer wall, said pin rotatably mounted about an axis of rotation on said body; and
   a block having a surface, said block mounted on said body for translational motion relative to said body between a first position, at which said surface of said block is adjacent to said curved outer wall of said pin, and a second position, at which a distance between said surface of said block and said curved outer wall of said pin is greater with said block in said first position, and wherein tension applied to the object when disposed between said surface of said block and said curved outer wall of said pin biases said block in the direction of said first position so as to reduce the distance between said surface of said block and said curved outer wall of said pin.

2. The clamping device of claim 1 wherein said translational motion of said body is substantially linear.

3. The clamping device of claim 2 wherein when said block is in said first position, said surface of said block contacts said perimeter of said pin.

4. The clamping device of claim 2 wherein said body includes a center line, said axis of rotation of said pin is disposed to a first side of said center line, and said block is linearly moveable relative to said body along a line segment that is oblique to said center line and in a region of said body disposed on a second side of said center line.

5. The clamping device of claim 4 wherein when said block is in said first position, the clamping device is in an engaged configuration, and wherein when said block is in said second position, the clamping device is in a disengaged configuration.

6. The clamping device of claim 5, wherein when the clamping device is in said disengaged position, said gap will accept an end of a scroll saw blade.

7. The clamping device of claim 5 further comprising an element for applying a biasing force for biasing said block along said oblique line segment toward said first position.

8. The clamping device of claim 7 wherein said element for biasing said block toward its said first position comprises an arm, said arm mounted on said body for rotation about said pin's rotational axis, and wherein said arm also is connected to said block such that the rotation of said arm about said rotational axis and in a direction opposing said biasing force urges said block toward said second position.

9. The clamping device of claim 8 wherein said element for biasing said block toward its said first position comprises a coil spring.

10. The clamping device of claim 8, further comprising a raised wall portion disposed on said body and having a surface parallel to said oblique line segment, said surface of said raised wall portion closely abutting a side surface of said block.

11. The clamping device of claim 10 further comprising a cuff portion projecting from said raised wall portion and positioned to closely abut said block.

12. The clamping device of claim 11 wherein said cuff portion further comprises a projecting tongue and wherein said block defines a groove, said projecting tongue slidably disposed within said groove to retain said block on said body.

13. The clamping device of claim 4 wherein said body defines a slot and wherein said block is mounted within said slot for linear motion along said line oblique to said center line of said body.

14. The clamping device of claim 4, wherein said block is substantially wedge-shaped.

15. The clamping device of claim 4, wherein said perimeter of said pin is substantially cylindrical.

16. The clamping device of claim 4, wherein said the surface of said block is substantially parallel to a plane containing said center line.

17. The clamping device of claim 4, further comprising a radiused wall portion disposed on said body and in close communication with a portion of said perimeter of said pin.

18. The clamping device of claim 2, further comprising a fastening portion attached to said body and adapted for operably attaching said clamping device to another object.

19. The clamping device of claim 2 wherein the clamping device is a saw blade clamp for a scroll saw.

20. The clamping device of claim 2 wherein said surface of said block is roughened so as to better grip the object to be clamped within the clamping device.

21. A scroll saw comprising:
   a base portion;
   a workpiece support mounted to said base portion;
   a generally C-shaped yoke mounted to said base portion for reciprocating motion thereon and comprising a first arm and a second arm for connecting a saw blade therebetween; and
   a saw blade clamp operably connected to one of said first and second arms, said saw blade clamp comprising:
      a body;
      a pin having a curved outer wall, said pin rotatably mounted about an axis of rotation on said body; and
      a block having a surface, said block mounted on said body for translational motion relative to said body between a first position, at which said surface of said block is adjacent to said curved outer wall of said pin, and a second position, at which a distance between said surface of said block and said curved outer wall of said pin is greater than when said block is in said first position, tension applied to the object when disposed between said surface of said block and said curved outer wall of said pin causing said block to move in the direction of said first position so as to reduce the distance between said surface of said block and said curved outer wall of said pin.

22. The scroll saw of claim 21 wherein said saw blade clamp comprises:

said body having a center line;

said pin rotatably mounted on said body in a region of said body that is to one side of said center line; and said block mounted on said body for translational motion relative to said body along a line oblique to said center line, said block movable along said oblique line between a first position wherein said surface of said block is adjacent to said curved outer wall of said pin, and a second position wherein a distance between said surface of said block and said curved outer wall of said pin is greater than when said block is in said first position.

23. The scroll saw of claim 22 wherein a tensioning device is connected to one of said first and second arms and wherein said clamping device is connected to said tensioning device.

24. An apparatus for securing an object between the apparatus and a second attachment point, the apparatus comprising:

a first member;

a cylindrical second member, said second member rotatably mounted on said first member and having a perimeter; and a third member having a surface, said third member slidingly mounted on said first member and movable in a substantially linear motion between a first position, at which said surface of said third member is adjacent said perimeter of said second member, and a second position, at which a distance between said surface and said perimeter is greater than in said first position, said third member being urged toward said first position when the object is disposed between said surface and said perimeter and moved in the direction of the second attachment point.

25. A clamping device for securing an object, the clamping device comprising:

a body having a center line;

a pin having a perimeter, said pin rotatably mounted about an axis of rotation on a first side of said center line of said body;

a block having a surface, said block mounted on a second side of said center line of said body for translational motion relative to said body between an engaged configuration, at which said surface of said block contacts said perimeter of said pin, and a disengaged configuration, at which a distance between said surface of said block and said perimeter of said pin is greater than when said block is in said engaged configuration, tension applied to the object when disposed between said surface of said block and said perimeter of said pin causing said block to move in the direction of said engaged configuration so as to reduce the distance between said surface of said block and said perimeter of said pin; and an element for applying a biasing force for biasing said block toward said engaged configuration.

26. The clamping device of claim 25 wherein said element for biasing said block toward its said engaged configuration comprises an arm, said arm mounted on said body for rotation about said pin's rotational axis, and wherein said arm also is connected to said block such that the rotation of said arm about said rotational axis and in a direction opposing said biasing force urges said block toward said disengaged position.

27. The clamping device of claim 26 wherein said element for biasing said block toward its said engaged configuration comprises a coil spring.

28. The clamping device of claim 26, further comprising a raised wall portion disposed on said body and having a surface parallel to said oblique line segment, said surface of said raised wall portion closely abutting a side surface of said block.

29. The clamping device of claim 31 further comprising a cuff portion projecting from said raised wall portion and positioned to closely abut said block.

30. The clamping device of claim 29 wherein said cuff portion further comprises a projecting tongue and wherein said block defines a groove, said projecting tongue slidably disposed within said groove to retain said block on said body.

31. A clamping device for securing an object, the clamping device comprising:

a body having a center line;

a pin having a perimeter, said pin rotatably mounted about an axis of rotation on a first side of said center line of said body;

a block having a surface; and a slot defined by said body, a second side of said center line wherein said block is mounted within said slot for linear motion relative to said body between a first position, at which said surface of said block contacts said perimeter of said pin, and a second position, at which a distance between said surface of said block and said perimeter of said pin is greater than when said block is in said first position, tension applied to the object when disposed between said surface of said block and said perimeter of said pin causing said block to move in the direction of said first position so as to reduce the distance between said surface of said block and said perimeter of said pin.

32. A clamping device for securing an object, the clamping device comprising:

a body having a center line;

a pin having a perimeter, said pin rotatably mounted about an axis of rotation on a first side of said center line of said body; and a substantially wedge-shaped block having a surface, said block mounted on a second side of said center line of said body for translational motion relative to said body between a first position, at which said surface of said block contacts said perimeter of said pin, and a second position, at which a distance between said surface of said block and said perimeter of said pin is greater than when said block is in said first position, tension applied to the object when disposed between said surface of said block and said perimeter of said pin causing said block to move in the direction of said first position so as to reduce the distance between said surface of said block and said perimeter of said pin.

33. A clamping device for securing an object, the clamping device comprising:

a body having a center line;

a pin having a perimeter, said pin rotatably mounted about an axis of rotation on a first side of said center line of said body; and a block having a surface substantially parallel to a plane including said center line, said block mounted on a second side of said center line of said body for trans lational motion relative to said body between a first position, at which said surface of said block is adjacent to said perimeter of said pin, and a second position, at which a distance between said surface of said block and said perimeter of said pin is greater than when said block is in said first position, tension applied to the object when disposed between said surface of said block and said perimeter of said pin causing said block to move in the direction of said first position so as to reduce the distance between said surface of said block and said perimeter of said pin, said axis of rotation of said pin is disposed to a first side of said center line, and said block is linearly moveable relative to said body along a line segment that is oblique to said center line and in a region of said body disposed on a second side of said center line.

* * * * *

UNITED STATES PATENT AND TRADEMARK OFFICE
CERTIFICATE OF CORRECTION

PATENT NO.    : 6,105,482
DATED         : August 22, 2000
INVENTOR(S)   : Garcia et al.

Page 1 of 1

It is certified that error appears in the above-identified patent and that said Letters Patent is hereby corrected as shown below:

Claim 1,
Line 12, after "greater", insert -- than --.

Column 1,
Line 20, delete "many" an substitute therefor -- may --.

Column 9,
Line 16, delete "them" and substitute therefor -- then --.
Line 20, delete "suitable" and substitute therefor -- suitably --.

Signed and Sealed this

Thirtieth Day of October, 2001

Attest:

*Nicholas P. Godici*

NICHOLAS P. GODICI
*Attesting Officer*    Acting Director of the United States Patent and Trademark Office